A. J. SARGENT.
SPRAYING ATTACHMENT FOR HOSE NOZZLES.
APPLICATION FILED JAN. 13, 1915.
1,158,302.  
Patented Oct. 26, 1915.
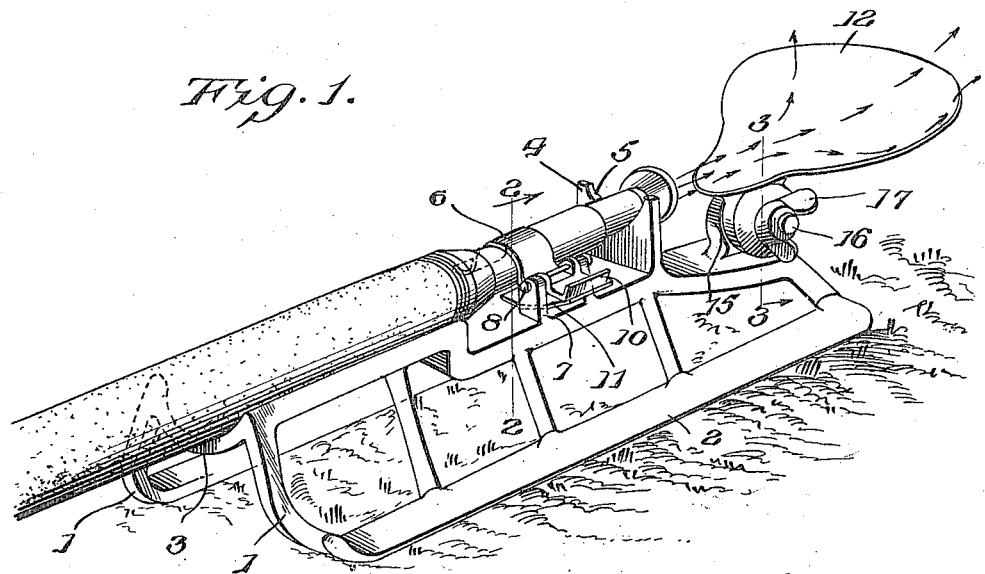
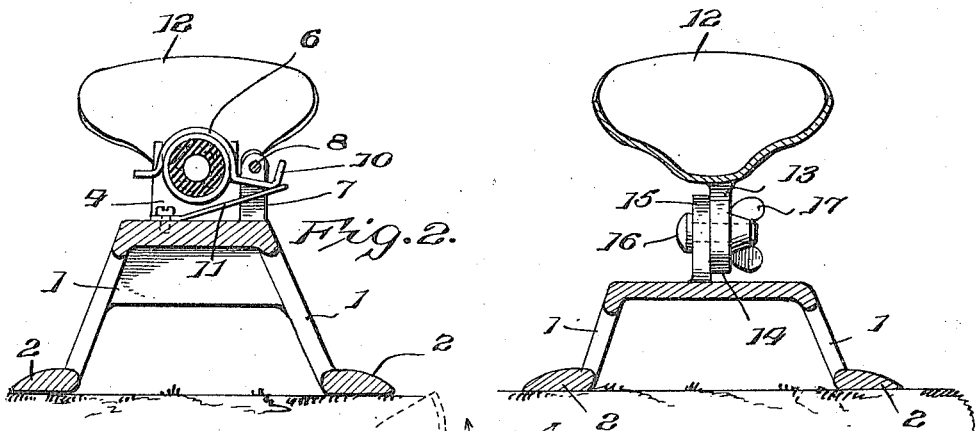
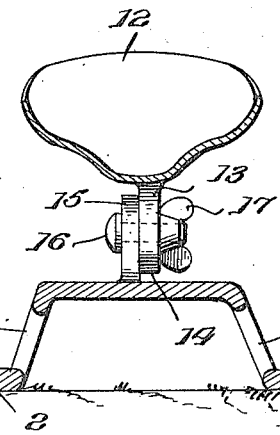
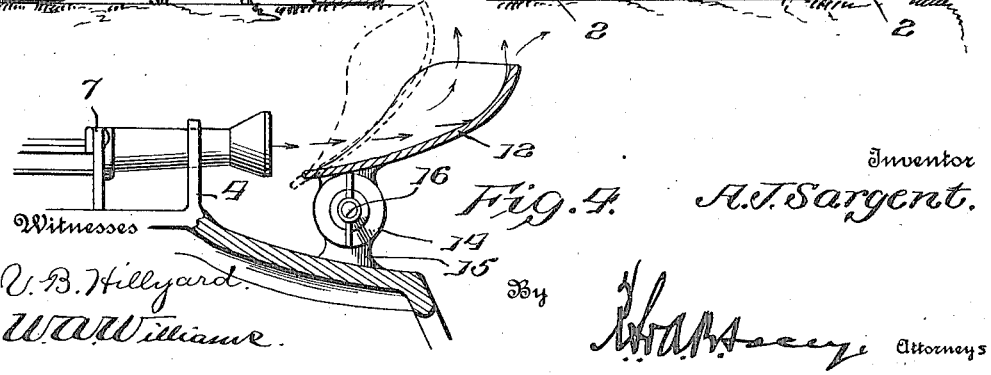

UNITED STATES PATENT OFFICE.

ALONZO J. SARGENT, OF JACKSON, MICHIGAN.

SPRAYING ATTACHMENT FOR HOSE-NOZZLES.

1,158,302.  Specification of Letters Patent.  Patented Oct. 26, 1915.

Application filed January 13, 1915. Serial No. 2,028.

*To all whom it may concern:*

Be it known that I, ALONZO J. SARGENT, a citizen of the United States, residing at Jackson, in the county of Jackson and State of Michigan, have invented certain new and useful Improvements in Spraying Attachments for Hose-Nozzles, of which the following is a specification.

The primary purpose of this invention is the provision of a device to be attached to the nozzle of a garden hose for converting the stream of water issuing from the nozzle into a spray whereby lawns, gardens and like surfaces may be thoroughly and properly watered when required without producing any washouts which are objectionable from many causes, chiefly because of the exposure of the roots of plants and grass.

The invention provides a device which may be drawn over the surface to be watered, and which admits of the ready attachment of the sprayer to the nozzle or the quick and easy detachment of the device from such nozzle as required, such device including a positive clamp which, while securing the nozzle in the required position, admits of adjustment of such nozzle when required.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings:—Figure 1 is a perspective view of a spraying attachment embodying the invention, showing the hose nozzle in place thereon. Fig. 2 is a transverse section on the line 2—2 of Fig. 1. Fig. 3 is a transverse section on the line 3—3 of Fig. 1. Fig. 4 is a detail longitudinal section of the front portion of the device.

Corresponding and like parts are referred to in the following description and indicated in all the views of the drawings by the same reference characters.

The body of the device is elongated and of arch-form in transverse section and comprises a top and side members 1, the latter constituting runners which are widened at their lower edges to form shoes 2 for properly supporting the sprayer and also giving an extended base thereto to prevent tilting. The shoes 2 are in the nature of outwardly extending flanges and serve to prevent the sinking of the runners in the surface of the ground as well as enabling the device to glide more readily upon the surface when moved thereover. In order to secure lightness the side members, or runners 1, may be of openwork. The top of the body is raised for a short distance at one end and is longitudinally depressed, as indicated at 3, to form a seat for receiving the body portion of the hose nozzle. A rest 4 is disposed near the front of the body and consists of a stud rising therefrom and notched in its upper end, as indicated at 5, to receive the tip of the nozzle and act jointly with the seat 3 to hold the nozzle in proper position. The intermediate portion of the top between the rest 4 and seat 3 is depressed and provided with a clamp for retaining the nozzle in the required adjusted position. The clamp comprises essentially a jaw 6 which is resilient so as to conform readily to the part of the nozzle in contact with the jaw. Spaced ears 7 are disposed at one side of the body and pivotally support the jaw 6, a pin 8 passing through openings formed in the ears 7 and openings formed in ears 9 forming a part of the jaw 6. The ears 7 preferably consist of an integral part of the body and are cast therewith. The jaw 6 is transversely arranged and occupies a relatively horizontal position so as to engage over the upper portion of the hose nozzle. The jaw 6 is formed with an outer extension 10 which constitutes a finger piece to admit of convenient manipulation of the jaw when placing the hose nozzle in position or removing the same from the sprayer. A spring 11 secured at one end to the body of the sprayer is arranged to have its opposite end exert an upward pressure upon the finger piece or outer extension 10 of the jaw, thereby pressing the jaw downward to enable it to grip the hose nozzle.

The forward end of the body is depressed and the extremity thereof supports the spreader or deflector 12 which is approximately of spoon shape and arranged with the contracted end facing rearward and the bowl portion extending forward. A stem 13 depends from the spreader 12 and its lower end is enlarged and of circular form, as indicated at 14. A stud 15 corresponding in shape to the circular enlargement 14 projects upwardly from the body of the sprayer and the parts 14 and 15 are placed side by side and are held in place by means of a bolt 16 and thumb nut 17. When the thumb nut 17 is tightened the parts 14 and 15 are drawn together and engage frictionally so as to hold the spreader or deflector 12 in the required adjusted position.

The concave or hollow side of the spreader 12 faces upward and the side portions extend upwardly to a greater height than the end portion, thereby enabling the spray to be spread laterally so as to cover a great extent of surface. By proper adjustment of the spreader about the bolt 16 the forward end thereof may be elevated more or less, thereby enabling a large control of the spray to meet varying conditions. The median line of the spreader is in line with the seat 3 and notch 5, hence the jet issuing from the hose nozzle, when the latter is in place, strikes the spreader on a median line and is deflected equally in opposite directions.

In the application of the invention the hose nozzle is placed with its body portion resting in the seat 3 and with its tip fitted in the notch 5. During the adjusting of the nozzle the outer end of the extension 10 is pressed upon so as to elevate the jaw 6. After the nozzle has been adjusted to the required position pressure is removed from the extension 10 when the spring 11 comes into play to press the jaw 6 upon the nozzle and hold the same in place. The spreader or deflector 12 may be adjusted to attain the desired result by loosening the thumb nut 17 and turning the spreader to the desired angle after which the spreader is made secure by retightening the fastening means holding such spreader to the stud 15. The device may be moved upon the lawn or over the surface to be watered by pulling upon the hose attached to the hose nozzle, or, if desired, a cord or like connection, not shown, may be attached to the body of the device and extended to a convenient point so as to be pulled upon to cause the device to glide over the surface upon the shoes 2 in the manner well understood.

Having thus described the invention, what is claimed as new is:—

A spraying attachment for hose nozzles, the same comprising an arch-shaped body formed with longitudinal runners and having its forward portion depressed and having front and rear longitudinally spaced raised portions depressed in their upper sides to form nozzle receiving seats, and having an upstanding ear intermediate the raised portions and to one side of a medial line, a body pivoted to the said ear and adapted to extend over the nozzle, a spring exerting a pressure upon the body to cause it to clamp the nozzle and a spreader pivoted to the forward depressed portion of the body and adjustable to any angle within a given range of movement.

In testimony whereof I affix my signature in presence of two witnesses.

ALONZO J. SARGENT. [L. S.]

Witnesses:
 B. F. KNIBLOE,
 C. H. COPSEY.

Copies of this patent may be obtained for five cents each, by addressing the "Commissioner of Patents, Washington, D. C."